July 17, 1928.
E. S. LINDLEY
METER FOR FLUIDS
Filed Jan. 19, 1925
1,677,189
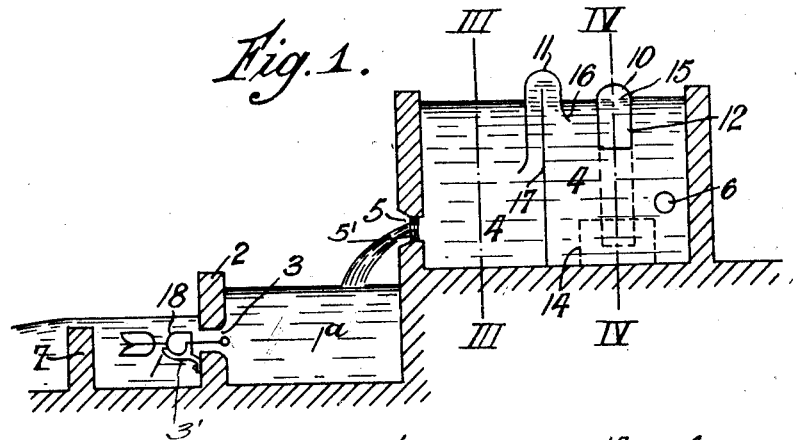
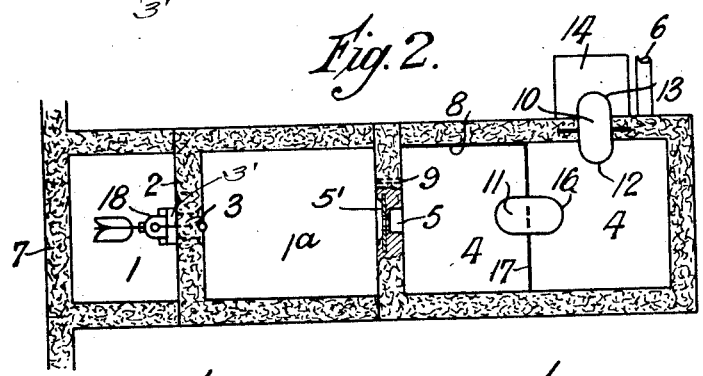
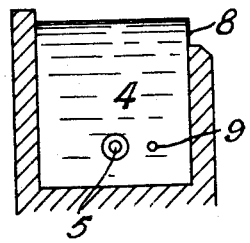
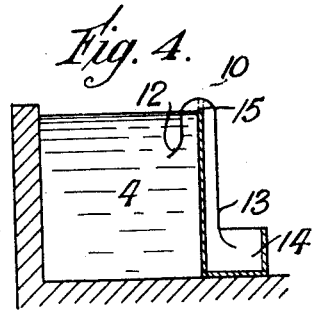
INVENTOR
E. S. LINDLEY,
By his Attorneys, Patented July 17, 1928.

1,677,189

UNITED STATES PATENT OFFICE.

EDWARD SEARLES LINDLEY, OF LAHORE, INDIA.

METER FOR FLUIDS.

Application filed January 19, 1925, Serial No. 3,290, and in India January 21, 1924.

This invention relates to a new method and means of and for rating meters for the measurement of fluid velocity.

While the method hitherto used entails towing the meter through still water at a known and measured rate, the method the subject of this invention entails fixing the meter and causing water to flow past it in a fixed manner and with a velocity that may or need not be known, but must be accurately reproducible on successive occasions.

Further objects of the invention are to provide means for keeping the velocity automatically constant during the test, for measuring the mean effect of such slight variations as occur, and for automatically interrupting the test in the event of more than permissible variation occurring.

The invention is illustrated in the accompanying drawings, which show apparatus for rating current meters of the type in which the force of the current causes some part to revolve.

In the drawings Figure 1 is a diagrammatic sketch; Figures 2 to 5 illustrate diagrammatically, in greater detail, a practical embodiment of the invention, Figure 2 being a longitudinal section, Figure 3 a plan of Figure 2, and Figure 4 a section on the line IV—IV, Figure 2, and Figure 5 a section on the line V—V, Figure 2.

1 is a trough and 1ª a tank separated therefrom by a diaphragm or wall 2, having in it an orifice 3, in which the meter to be rated is set. 4 is a second tank in the side or bottom of which there is also an orifice 5, the tank 4 being supplied with liquid through a pipe 6 by a pump or other means; the discharge from orifice 5 is allowed to fall into the tank 1ª, whence it passes through the orifice 3 to the trough 1 and is then allowed to escape. 7 is a weir keeping the orifice 3 submerged on the downstream side; it is essential that the whole of the discharge of orifice 5 and nothing but that discharge shall pass through orifice 3. The orifice 5 is set at a height sufficient to ensure that it shall not be submerged by the liquid in the trough 1.

As it is necessary to rate a meter at a number of different velocities, the orifice 5 is adjustable by any suitable known means such as a sliding plate 5′ provided with orifices of different sizes, and may be provided with some means for indicating the size to which it is set; an alternative is to provide a series of orifices for use in succession or in combination.

To provide for automatically keeping the water-level practically constant, in that side of the tank 4 in which the orifice 5 is located, a relatively wide weir 8 may be formed in one side of the said tank at or slightly below the required level, and the rate of feed to the said part of the tank 4 be made slightly greater than the discharge from the orifice 5. Such weir will take variations with relatively small variation of level, and thus keep the discharge of the orifice 5 relatively constant.

In order to be able to measure the mean effect of such variation of level as does occur, a further very small orifice 9 may be made in tank 4 at or near the level of orifice 5, and the total discharge of the said small orifice during a test be caught and compared with a quantity caught during a test when the water-level was maintained at a constant level.

To prevent an untrustworthy observer from accepting an observation in the course of which the water-level had been allowed to rise above or fall below predetermined permissible levels, or to facilitate the making of long-period observations by automatic recorders, without constant attention, siphons 10, 11 are fitted to tank 4, one leg 12 of the siphon 10 projecting into the tank 4, the other leg 13 being located within a sealing tank 14, the said siphon 10 passing over a crest 15 in the tank 4. One leg 16 of the second siphon 11 is arranged at a higher level than the leg 12 of the siphon 10, the said siphon 11 passing over a crest 17 dividing the tank 4 into two parts. Thus, if the water level rises above the crest 15, the water flows down the leg 13 of the siphon 10 into the tank 14, whereby the leg 13 is sealed in said tank 14. The air in the siphon 10 is then exhausted by the water flowing down the leg 13, whereby the water commences to flow from the tank 4 through the legs 12, 13 of the siphon 10. The flow of water will continue until the level of water in the tank 4 is at the level of the mouth of the leg 12, and as the level of the leg 16 of the siphon 11 is above the level of the leg 12 of the siphon 10, the vacuum in the said siphon 11 is destroyed, thus preventing the flow of liquid to the orifice 5 until the vacuum is intentionally restored in any known convenient manner.

In operation, a meter 18, which has been rated in any known manner, as by towing in a stream, is secured as at 3' at the downstream side of the orifice 3, the indication of the meter being recorded against the setting of the orifice 5. The orifice 5 is then varied, the new indication of the meter 18 being again recorded against this setting of the orifice 5, the operation being repeated according to the number of readings desired on the scale of the meter to be rated.

The meter 18 is then substituted by a meter it is desired to calibrate, the position assumed by the indicator of the meter for a given setting of the orifice 5 being marked to agree with the reading of the meter 18 when at the same setting of the said orifice 5. The area of the orifice 5 is then altered by adjusting to another setting, and the operation repeated until the desired number of calibrations on the meter to be rated is obtained.

This description of possible arrangement does not of course preclude variations of arrangement which do not entail departures from the essential principles described; thus, the orifice 5 may be submerged in trough 1 and the discharge determined from the difference of level on the two sides of it; or, for trough 1 and tank 1ᵃ with diaphragm 2 and orifice 3 may be substituted a closed channel with inlet and outlet and fixing for the meter, and suitably shaped to pass the discharge in a fixed manner, perhaps with a minimum loss of head. Equally it is not essential to include in the apparatus all the provisions described, irrespective of whether what they are intended to achieve is wanted or not.

While the apparatus described is intended for rating current-meters used for the measurement of velocities in observing discharges of natural and artifical streams of water, which meters are of types in which some part is caused to revolve by the force of the current, the scope of the invention is not restricted to that use; it is applicable also to other forms of device to measure the velocity at a point as distinct from the total quantity passing, to devices in which the quantity of fluid passing is deduced from the velocity at a point as measured in similar manner, to devices for measuring the velocity of ships through water, to devices used with fluids other than water or with gas, and generally to devices of similar nature which need to be calibrated to determine the correct quantitative value of their indication.

What I claim is:—

1. Apparatus for rating a meter comprising a tank, a second tank having an orifice in one side thereof, means for altering the effective cross sectional area of said orifice to vary the amount of liquid passing from the second tank to the first through said orifice, a trough having a passage communicating with the first tank in which trough the meter to be rated is adapted to be supported adjacent said passage, and means for maintaining the liquid level in said trough above the level of the passage.

2. Apparatus for rating a meter comprising a tank, a second tank having an orifice in one side thereof, means for altering the effective cross sectional area of said orifice to vary the amount of liquid passing from the second tank to the first through said orifice, a trough having a passage communicating with the first tank in which trough the meter to be rated is adapted to be supported adjacent said passage, and a weir in said trough for maintaining the liquid level therein above the level of the passage.

3. Apparatus for rating a meter comprising a tank, a second tank having an orifice in one side thereof, means for altering the effective cross sectional area of said orifice to vary the amount of liquid passing from the second tank to the first through the orifice, means for stopping the supply of liquid to said orifice if the liquid in the second tank varies appreciably from a predetermined level, a trough having a passage communicating with the first tank in which trough the meter to be rated is adapted to be supported adjacent said passage, and means for maintaining the liquid level in said trough above the level of the passage.

4. Apparatus for rating a meter comprising a tank, a second tank having an orifice in one side thereof, means for dividing the second tank into two parts, means for supplying liquid to the first part, a sealing tank, a siphon having one leg located in the first part and the other in said sealing tank, and a second siphon having one leg located in the first part of the second tank but at a higher level than the leg of the first siphon and having the other leg located in the second part of the second tank, said siphons acting to stop the flow of liquid into said second part of said second tank if the level varies appreciably from a predetermined level.

5. Apparatus for rating a meter comprising a tank, a second tank having an orifice in one side thereof, means for dividing the second tank into two parts, means for supplying liquid to the first part, a sealing tank, a siphon having one leg located in the first part and the other in said sealing tank, a second siphon having one leg located in the first part of the second tank but at a higher level than the leg of the first siphon and having the other leg located in the second part of the second tank, said siphons acting to stop the flow of liquid into said second part of said second tank if the level varies appreciably from a predetermined level, a trough having a passage communicating with the first tank in which trough the meter to be rated is adapted to be supported adjacent such passage, and means for maintaining the liquid level in said trough above the level of the passage.

EDWARD SEARLES LINDLEY.